United States Patent [19]
Smith et al.

[11] Patent Number: 5,697,394
[45] Date of Patent: Dec. 16, 1997

[54] LOW OBSERVABLE ENGINE AIR INLET SYSTEM

[75] Inventors: David R. Smith, West Haven; Armand F. Amelio, New Milford, both of Conn.

[73] Assignee: United Technologies Corporation, Hartford, Conn.

[21] Appl. No.: 20,015

[22] Filed: Mar. 2, 1993

[51] Int. Cl.$^6$ ............................................... B64D 33/02
[52] U.S. Cl. ............... 137/15.1; 137/15.2; 60/39.092; 244/53 B
[58] Field of Search ................. 60/39.092, 39.093; 244/53 B; 137/15.1, 15.2

[56] References Cited

U.S. PATENT DOCUMENTS

| | | | |
|---|---|---|---|
| 3,537,240 | 11/1970 | Weidinger et al. | 60/39.092 |
| 4,291,530 | 9/1981 | Ballard | 60/39.5 |
| 4,397,431 | 8/1983 | Ben-Porat | 60/39.092 |
| 4,406,433 | 9/1983 | Radkey et al. | 244/53 B |
| 4,655,413 | 4/1987 | Genssler et al. | 244/53 B |
| 4,836,473 | 6/1989 | Aulehla et al. | 244/53 B |
| 4,919,364 | 4/1990 | John et al. | 244/53 B |
| 5,116,251 | 5/1992 | Bichler et al. | 137/15.1 |

*Primary Examiner*—Michael J. Carone
*Attorney, Agent, or Firm*—Stephen A. Schneeberger

[57] ABSTRACT

A turbine engine inlet system includes a duct 14 to deliver air to the engine, inlet lips 16 and 52 to smooth the entry of air flowing into the duct, a screen 50 between the lips 52 and 16 for passage of inlet air, a forward inlet section 18 submerged within the aircraft skin contour to provide a degree of ram recovery to the duct, and a movable air deflector 20 which is positionable in a retracted position during normal flight, is extendable outward to a second position substantially flush with the screen 50 for maximum protection against foreign object damage (FOD), and is further extendable outward to a third position beyond the screen to provide an air bypass path when the screen is iced-over.

8 Claims, 4 Drawing Sheets

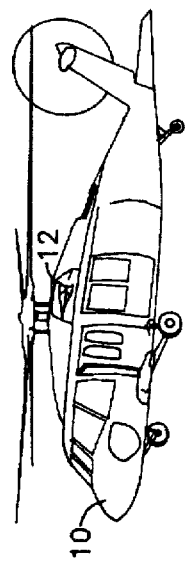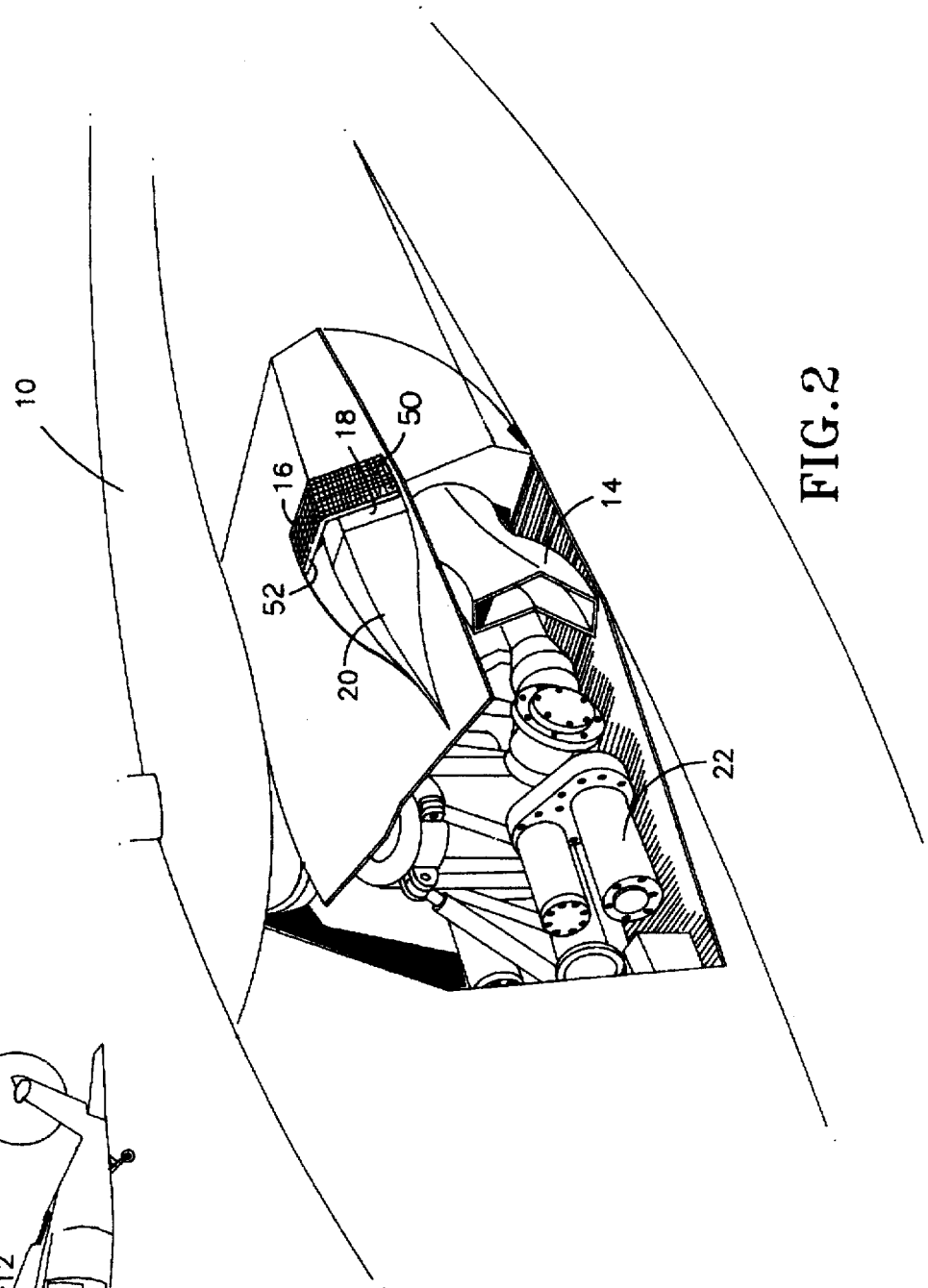
FIG.1
FIG.2

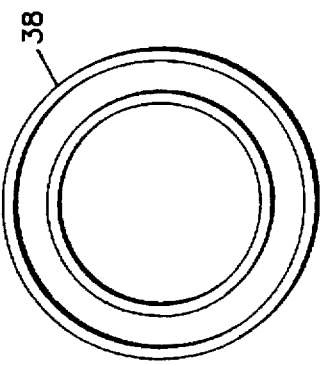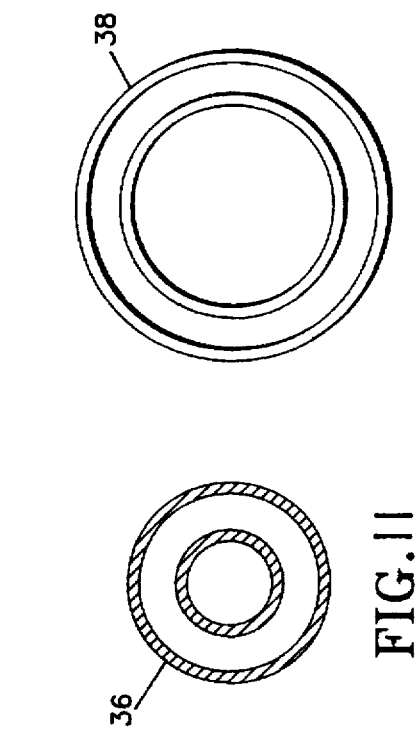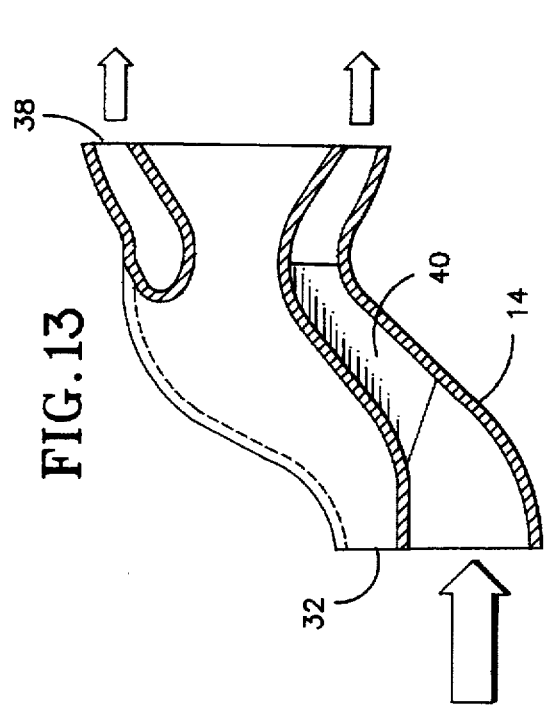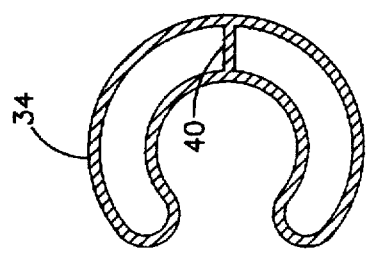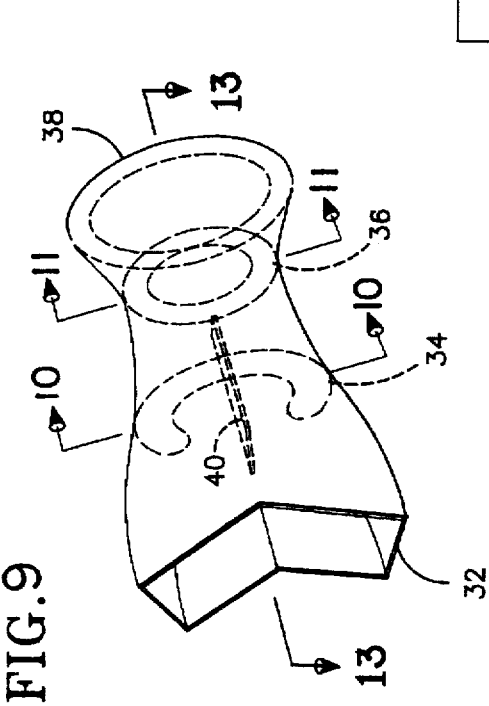

LOW OBSERVABLE ENGINE AIR INLET SYSTEM

CROSS REFERENCE TO RELATED APPLICATIONS

The subject matter of this application is related to that of U.S. application Ser. No. 07/507,686, filed Apr. 11, 1990 and assigned to the same assignee as the present application.

TECHNICAL FIELD

This invention relates to turbine engine air inlets, and more particularly, an inlet system which provides low radar observability and improved ice and foreign object engine damage protection.

BACKGROUND ART

Conventional rotorcraft turbine engine air inlet systems are usually designed, within the constraints of the overall aircraft mission requirements, for maximum ram recovery to maximize engine power available and for minimum surface area to minimize aircraft penalties for power for inlet anti-icing. These design goals typically result in short, forward facing, inlets with minimum turning.

The advent of low radar observability requirements has introduced additional requirements for inlet designs which are, to a degree, inharmonious with the desire for high performance and low anti-ice power. Direct line-of-sight to the engine front face must be avoided because turbine engine compressor vanes are highly visible to radar scanning devices. Avoiding this typically requires longer ducts with more turns which, consequently, decreases inlet pressure (head) thereby decreasing engine power available and increases inlet surface area thereby increasing anti-ice power requirements. In addition, newer structural materials used for lowering radar observability have increased heat transfer resistance relative to conventional materials which results in an increase in the anti-ice power required per unit area of duct surface to maintain the surface ice-free. Thus, radar observability requirements have two adverse impacts on inlet anti-icing power requirements; the additional turning for line-of-sight requirements increases duct surface area; and new duct materials increase anti-ice power per unit surface area. The combined effect results in significant increases in the energy, either electrical or bleed air, that must be provided for inlet anti-icing. This increased energy requirement leads in turn to either an increased size, weight, and power penalty for larger aircraft electrical generators or to higher levels of engine bleed air energy extraction which results in direct reduction of engine power available. Either case results in a significant impact on aircraft performance due to the reduction in power available to the rotor.

Additionally, buried engine installations, as opposed to engines mounted in pods external to the fuselage proper, are desirable from a radar observability viewpoint. On conventional rotorcraft where buried engines are employed for other reasons, it is typical to include some means for preventing the ice and/or slush which can accumulate on adjacent fuselage surfaces ahead of a forward-facing inlet from entering the inlet and representing a foreign object damage (FOD) hazard to the engine. Sometimes, the inlet inner surface is offset from the fuselage skin creating a gap which acts to prevent ingestion. In other cases, an external screen is employed to prevent ingestion. Neither of these means is particularly desirable from a radar observability viewpoint.

Another concern with conventional forward-facing inlets is ingestion of ice deliberately shed from other aircraft surfaces such as rotor blades which are protected by de-icing rather than anti-icing systems. An external screen is often used to address this concern as well. Again, a screen is not particularly desirable for low radar observability.

A low radar observable engine inlet which meets the above-mentioned requirements is, therefore, highly desirable.

One approach to meeting these requirements was taken in the cross-referenced U.S. patent application Ser. No. 07/507,686. In that application the engine inlet for a rotorcraft includes a curved duct to deliver air to the engine, an inlet lip at the outer edge of the duct to smooth the entry of air flowing into the duct, a forward inlet section which is submerged (depressed or recessed) into the aircraft skin contour to provide a degree of ram recovery to the duct, and a moveable deflector which is flush with the forward inlet section during normal flight conditions and is extended slightly beyond the inlet lip at the outer edge of the duct during icing conditions. While this system represents a significant improvement, the requirement for the deflector to move outward beyond the inlet lip when deployed so as to assure both adequate air intake and deflection of ice and foreign objects has an undesired effect. The characteristics of low radar observability are adversely affected by abrupt contour changes.

Therefor, it is highly desirable that there be provided an engine air inlet system having the foregoing desired characteristics, including further emphasis on reduced radar observability and FOD protection.

DISCLOSURE OF THE INVENTION

The object of the present invention is to provide for a rotorcraft engine inlet with optimal ram air recovery, minimal anti-icing power requirements, and ice/slush FOD protection, with improved low radar observable characteristics.

According to the present invention, a rotorcraft engine inlet includes a fuselage inlet section which is depressed into the contour of the helicopter and has an inlet lip for creating vortex airflow to augment airflow into a short, curved inlet duct which delivers air to the engine. A screen portion extends forwardly from the inlet lip of the duct and includes its own lip at the forward end thereof. A moveable deflector positioned forwardly of the inlet duct and the screen portion is adjustable inwardly/outwardly relative to the fuselage to each of at least three positions including a) inward of the inlet lip near to the recessed surface of the fuselage, b) adjacent the screen lip portion, and c) outward of the screen lip portion.

The present invention has several separate operating modes, including a) normal forward flight in which the deflector is relatively inward to allow high inlet pressure recovery, or ram; b) hover to moderate forward speed (during FOD/ice potential) c) operation occassioned by ice build up in which the deflector is relatively outward of the screen portion lip to provide bypass air path.

These and other objects, features and advantages of the present invention will become more apparent in the light of the detailed description of exemplary embodiments thereof, as illustrated by the drawings.

BRIEF DESCRIPTION OF THE DRAWINGS

FIG. 1 is a perspective view of a helicopter.

FIG. 2 is a perspective view of the helicopter engine inlet of FIG. 1, showing a portion of the helicopter surface partly removed.

FIG. 9 is a perspective view of the internal duct of the present invention.

FIG. 10 is a sectional view taken along line 10—10 of FIG. 9.

FIG. 11 is a sectional view taken along line 11—11 of FIG. 9.

FIG. 12 is an end view of the exit end of the internal duct of the present invention.

FIG. 13 is a sectional view taken along line 13—13 of FIG. 9.

BEST MODE FOR CARRYING OUT THE INVENTION

Figure 5:
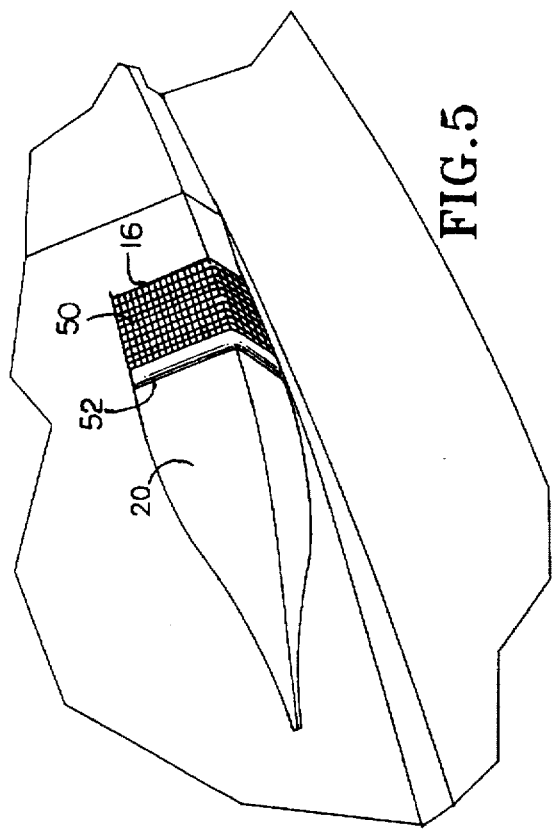
FIG. 5 is a view similar to FIG. 3 but with the deflector in the flush position.

Referring now to FIG. 1, a helicopter 10 includes turbine engines (not shown) which receive air through engine inlets 12, only one of which is shown.

Referring now to FIG. 2, the helicopter 10 engine inlet system of the present invention includes an internal air intake duct 14, a primary inlet lip 16, a forward inlet section 18 recessed in the skin contour of helicopter 10 and an extendable deflector 20. Additionally, a screen 50 extends forwardly from lip 16 to provide protection against foreign object damage (FOD). A second lip 52 is provided at the forward end of FOD screen 50. The external portions 16, 18, 20, 50 and 52 of the engine inlet system are formed as part of the aircraft surface which, once partially removed, reveals the transmission 22 (for powering the rotor system) and internal air duct 14 (for delivering air to the engine, which is not shown).

Figure 3:
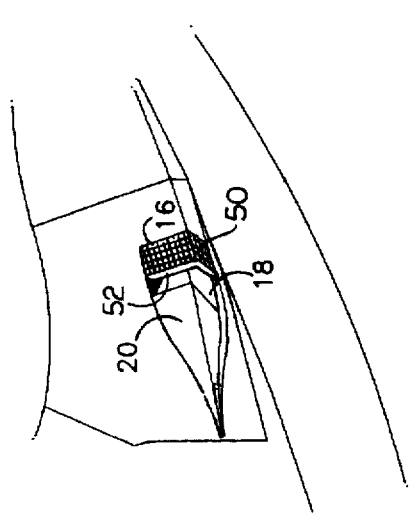
FIG. 3 is a perspective view partly broken away of the forward inlet section of the present invention with the deflector in the stored, or retracted, position.
Figure 4:
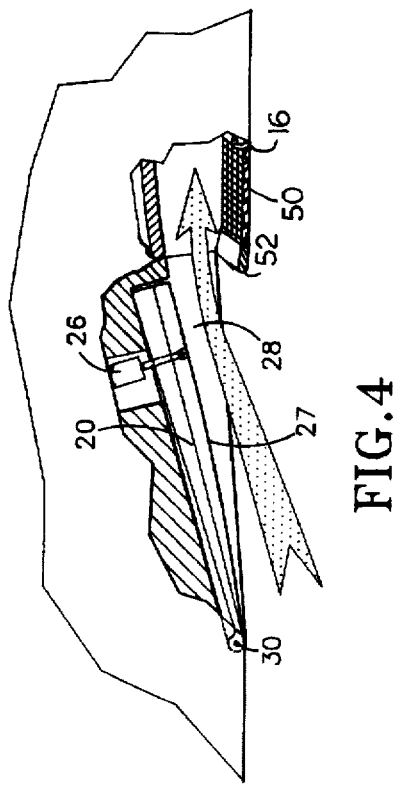
FIG. 4 is a plan view partly broken away and partly in section of the forward inlet section of the present invention with the deflector in the stored, or retracted, position.

Referring now to FIGS. 3 and 4, the position of the deflector 20 is controlled by an actuator 26 which pivots the deflector about a point 30. In the stored, or retracted, position shown here, the outer surface 27 rests contiguous with the outer surface of forward inlet section 18 which is recessed in the contour of helicopter 10. Together they form a trough 28 which captures air to be delivered to duct 14 in a manner providing high inlet pressure (ram) recovery. Lip 16 has a smooth, rounded, leading edge in order to smooth the entry of air into duct 14 (minimizing any turbulence which might otherwise occur). Lip 16 and duct 14 also may be heated by various suitable means (not shown) for anti-icing purposes. The FOD screen 50 may be permanently or removably secured at its aft edge to the inlet lip 16 and/or to the edges of the inlet cut-out. The lip 52 at the forward end of FOD screen 50 provides the forward skeletal support to the screen and although usually not heatable, it does include a smooth rounded leading edge similar to lip 16 in order to smooth the entry of air. The FOD screen 50 is built into a frame assembly bounded on its forward edge by the screen lip 52. The screen 50 is constructed of durable materials, such as stainless steel, to provide FOD protection. The screen 50 may normally be removed during L. O. operation. Alternatively, the screen 50 can be designed to remain installed during L. O. operation, in which case it would be constructed of non-conductive, radar transparent, composite-type material, or the like. The mesh size of FOD screen 50 is within a range which is large enough to provide good passage of air yet small enough to prevent FOD of significant size from entering the engine. That range of mesh size is typically between about 0.10 and 0.25 inch.

Figure 6:
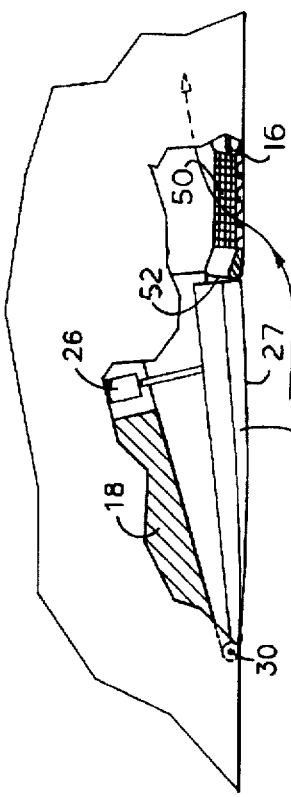
FIG. 6 is a view similar to FIG. 4 but with the deflector in the flush position.

Referring now to FIGS. 5 and 6, the actuator 26 is extended part-way to an intermediate position, during hover or low to moderate (80 knots) forward speed when L. O. operation is required and some ice and FOD protection is also required. In this position, the trailing (aft) edge of deflector 20 is flush with the FOD screen lip 52 and the deflector 20 is generally flush, or coplanar, with the FOD screen 50. A relatively small clearance exists between deflector 20 and FOD screen lip 52 in this position. The deflector 20 is preferably constructed of a solid material which would not allow air to pass through it. The inlet performs as a side facing inlet in this mode of operation, and air enters in the manner depicted by the flow arrow. Ice and other foreign objects are excluded by deflector 20 and by FOD screen 50 and are not ingested by the engine. The increased air density during cold, icing conditions increase available engine power, thereby at least partially compensating aircraft performance when it is needed. It is generally not necessary to anti-ice the deflector 20. The functioning of deflector 20 also reduces the anti-ice power requirements of duct 14 because ice accretion is prevented by the fact that larger airborne water droplets cannot easily turn abruptly around the aft edge of the deflector and into duct 14 through screen 50.

Figure 7:
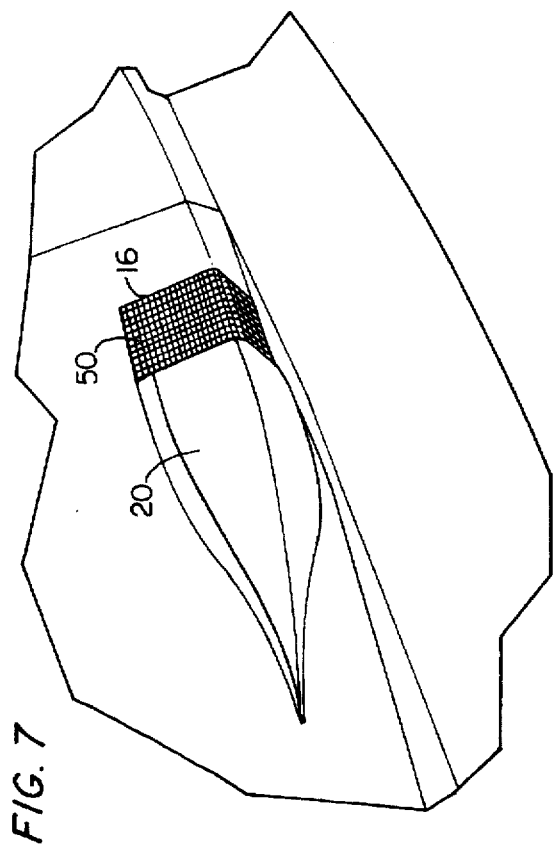
FIG. 7 is a view similar to FIGS. 3 and 5 but with the deflector extended in the bypass air path position.
Figure 8:
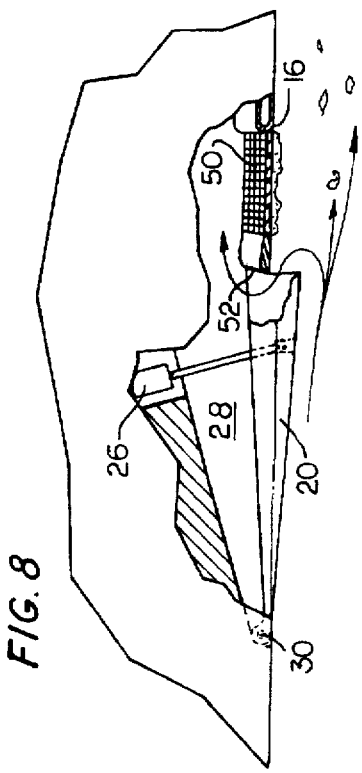
FIG. 8 is a view similar to FIGS. 4 and 6 but with the deflector in the bypass air path position.

Referring now to FIGS. 7 and 8, the actuator 26 and thus also deflector 20, are shown in a fully extended position in which the aft end of the deflector is outboard of the FOD screen lip 52. In this position the deflector 10 serves to further deflect ice and other foreign objects, while also creating a path shown by the flow arrow for incoming air which bypasses an ice-coated screen 50. This mode of operation is entered either when the screen 50 becomes iced-over, as by ice 54, or in anticipation of such condition. A pressure sensor in the inlet detects a decrease in air pressure as an indication that ice is accumulating on screen 50.

Referring now to FIGS. 9-12, the cross-sectional shape of duct 14 changes from a chevron shape at inlet face 32, to a rounded U-shape at point 34, to a small annulus at point 36, to a larger annulus at outlet point 38. The annulus shape at outlet 38 matches the turbine engine face, which is not shown. The shape of duct 14 minimizes direct line-of-sight to the engine front face while minimizing airflow turbulence and thus engine power loses. The chevron shape of the duct at face 32 also minimizes radar observability. A vane 40 may be attached inside duct 14 to even further block direct line-of-sight through the engine with the drawback that it must be electrically de-iced.

Referring now to FIG. 13, airflow enters duct 14 at the chevron-shaped inlet face 32 and exits at point 38. Direct line-of-sight from inlet face 32 to exit 38 is minimized by the curved shape of the duct.

From the foregoing it will be understood that the deflector 20 can assume three different positions, to wit, fully retracted, intermediate (flush), and fully extended, depending upon the flight regime of the aircraft and its need for FOD/ice protection and, to a lesser extent, L. O. characteristics. The positioning of deflector 10 may be accomplished automatically by sensors which monitor aircraft speed and various parameters indicative of icing. Manual override and control is also provided.

Once the deflector 20 opens because of activation of the ice protection system, it remains open for the duration of the flight to prevent any residual ice which might shed from forward surfaces from entering the inlet.

Assuming the FOD screen 50 is removably attached to the helicopter 10, it is then possible to remove the screen and its lip 52 during missions requiring the lowest possible radar cross section and/or the highest possible engine performance.

Although the invention has been shown and described with exemplary embodiments thereof, it should be understood by those skilled in the art that the foregoing and various other changes, omissions and additions may be made therein and thereto without departing from the spirit and the scope of the invention.

What is claimed is:

1. A turbine engine inlet for an aircraft having a skin contour, comprising:

a duct for directing air to the aircraft engine, the duct having an inlet face which protrudes relatively outward of the portion of the aircraft skin contour which is immediately forward of the duct face, the duct inlet face having an outer edge and an inner edge;

a first inlet lip formed in the aircraft surface over said outer edge of said inlet face;

a screen extending forwardly from the first inlet lip and including a second inlet lip at the forward end thereof;

a forward section in the aircraft skin forward of and adjacent to said inner edge of said inlet face having a moveable deflector; and means for positioning said moveable deflector at each of at least three positions including a first retracted position wherein said deflector is adjacent to the inward edge of said inlet face during normal flight, a second position outward of said first position wherein said deflector is substantially flush with said screen such that air passes to the duct through the screen, and a third position outward of said screen such that air may bypass the screen and pass to the duct if the screen is occluded.

2. The aircraft turbine engine inlet according to claim 1 wherein said inlet face and said screen are chevron shaped.

3. The aircraft turbine engine inlet according to claim 2 wherein said moveable deflector is chevron shaped.

4. The aircraft turbine engine inlet according to claim 1 wherein said screen is removably attached to said inlet.

5. The aircraft turbine engine inlet according to claim 1 wherein said screen is formed of stainless steel.

6. The aircraft turbine engine inlet according to claim 1 wherein said screen comprises a mesh in the range of 0.10 to 0.25 inch.

7. The aircraft turbine engine inlet according to claim 1 wherein said duct includes at least one bend for preventing direct line of sight to the aircraft engine.

8. The aircraft turbine engine inlet according to claim 1 wherein said screen is constructed of durable material.

* * * * *